United States Patent
Thubert et al.

(10) Patent No.: US 9,088,608 B2
(45) Date of Patent: Jul. 21, 2015

(54) THROTTLING AND LIMITING THE SCOPE OF NEIGHBOR SOLICITATION (NS) TRAFFIC

(71) Applicant: Cisco Technology, Inc., San Jose, CA (US)

(72) Inventors: Pascal Thubert, La Colle sur Loup (FR); Eric Levy-Abegnoli, Valbonne (FR); Vincent J. Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/795,993

(22) Filed: Mar. 12, 2013

(65) Prior Publication Data

US 2014/0282864 A1 Sep. 18, 2014

(51) Int. Cl.
*H04L 29/06* (2006.01)
*H04W 12/12* (2009.01)

(52) U.S. Cl.
CPC .......... *H04L 63/1458* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 7,720,006 B1 | 5/2010 | Yadav | |
| 8,059,661 B2 | 11/2011 | Patel et al. | |
| 8,312,541 B2 | 11/2012 | Levy-Abegnoli et al. | |
| 8,488,557 B2 * | 7/2013 | Liu et al. | 370/331 |
| 2007/0036110 A1 * | 2/2007 | Preguica | 370/331 |
| 2007/0130427 A1 * | 6/2007 | Lahti et al. | 711/133 |
| 2007/0160064 A1 * | 7/2007 | Kwon et al. | 370/395.52 |
| 2009/0024758 A1 * | 1/2009 | Levy-Abegnoli et al. | 709/237 |
| 2010/0313265 A1 * | 12/2010 | Lin et al. | 726/22 |
| 2011/0103344 A1 | 5/2011 | Gundavelli et al. | |
| 2011/0182293 A1 * | 7/2011 | Seo et al. | 370/392 |
| 2012/0314624 A1 | 12/2012 | Asati et al. | |
| 2013/0018993 A1 | 1/2013 | Hui et al. | |
| 2013/0091269 A1 | 4/2013 | Zhang et al. | |
| 2013/0294451 A1 * | 11/2013 | Li et al. | 370/392 |

OTHER PUBLICATIONS

Arkko, J., et al., "SEcure Neighbor Discovery", IETF Network Working Group, Request for Comments 3971, Mar. 2005, 56 pages.
Bagnulo, et al., "SEND-Based Source-Address Validation Implementation", draft-ietf-savi-send-06, IETF Internet Draft, Oct. 2011, 29 pages.
Bi, et al., "SAVI for Mixed Address Assignment Methods Scenario", draft-ietf-savi-mix-01, IETF Internet Draft, Oct. 2011, 8 pages.
Bi, et al., "SAVI Solution for DHCP", draft-ietf-savi-dhcp-11.txt, IETF Internet Draft, Dec. 2011, 27 pages.

(Continued)

*Primary Examiner* — Christopher Revak
(74) *Attorney, Agent, or Firm* — Parker Ibrahim & Berg LLC; James M. Behmke; Stephen D. LeBarron

(57) ABSTRACT

In one embodiment, a switch in a computer network may receive a neighbor solicitation (NS) message for a target node for which no neighbor authentication (NA) reply has been received at the switch. The switch may then determine whether to forward the NS message to only non-constrained links of the switch, or to both non-constrained links and constrained links of the switch. The determining may be configured to intermittently result in forwarding the NS message for the target node to both the non-constrained links and the constrained links. The switch may then forward the NS message according to the determination.

20 Claims, 8 Drawing Sheets

(56) References Cited

OTHER PUBLICATIONS

Bi, et al., "SAVI Solution for DHCP", draft-ietf-savi-dhcp-15, IETF, SAVI Internet Draft, Sep. 2012, 36 pages.

McPherson, et al., "SAVI Threat Scope", draft-ietf-savi-threat-scope-05, IETF Internet Draft, Apr. 2011, 22 pages.

Narten, et al., "Neighbor Discovery for IP Version 6 (IPv6)", IETF Request for Comments 1970, Aug. 1996, 82 pages.

Narten, et al., "Neighbor Discovery for IP Version 6 (IPv6)", IETF Request for Comments 2461, Dec. 1998, 93 pages.

Narten, et al., "Neighbor Discovery for IP Version 6 (IPv6)", IETF Request for Comments 4861, Sep. 2007, 97 pages.

Nordmark, et al., "FCFS SAVI: First-Come First-Serve Source-Address Validation for Locally Assigned IPv6 Addresses", draft-ieft-savi-fcfs-14, IETF Task Force Trust, Network Working Group, Feb. 2012, 32 pages.

Nordmark, et al., "FCFS SAVI: First-Come First-Serve Source-Address Validation for Locally Assigned IPv6 Addresses", RFC 6620, IETF Task Force Trust, May 2012, 35 pages.

Thomson, et al., "IPv6 Stateless Address Autoconfiguration", IETF Request for Comments 1971, Aug. 1996, 22 pages.

Thomson, et al., "IPv6 Stateless Address Autoconfiguration", IETF Request for Comments 2462, Dec. 1998, 25 pages.

Thomson, et al., "IPv6 Stateless Address Autoconfiguration", IETF Request for Comments 4862, Sep. 2007, 30 pages.

Wu, et al., "Source Address Validation Improvement Framework", draft-ietf-savi-framework-06, IETF Internet Draft, Dec. 2011, 15 pages.

\* cited by examiner

US 9,088,608 B2

THROTTLING AND LIMITING THE SCOPE OF NEIGHBOR SOLICITATION (NS) TRAFFIC

TECHNICAL FIELD

The present disclosure relates generally to computer networks, and, more particularly, to neighbor solicitation (NS) traffic control in computer networks.

BACKGROUND

It may be desirable for switches and/or other network devices to be more and more IPv6 (Internet Protocol version 6)-aware in order to protect the network against rogue or uncontrolled behaviors, particularly in secure environments. For instance, IPv6 "First Hop Security (FHS)" is a suite of features that operates on a switch to protect the layer-2 (L2) network against misuse of IPv6 protocols such as the neighbor discovery (ND) protocol (NDP) and the dynamic host configuration protocol (DHCP).

ND is a multicast intensive protocol that can create substantial control plane overhead and is susceptible to various forms of misuse, such as a scanning-type attack. For example, in order to support virtual local area networks (VLANs) in IEEE Std. 802.11, a controller usually unicasts a packet to all wireless devices that are members of a subnet, one by one. This poses a significant security risk in IPv6 with respect to a scanning attack, in which an outside attacker sends a packet to a large number of IPv6 addresses that are derived from the same subnet, because the effect will be multiplied with respect to the wireless network, effectively creating a denial of service (DOS) attack on the wireless network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a switch in a computer network may receive a neighbor solicitation (NS) message for a target node for which no neighbor authentication (NA) reply has been received at the switch. The switch may then determine whether to forward the NS message to only non-constrained links of the switch, or to both non-constrained links and constrained links of the switch. The determining may be configured to intermittently result in forwarding the NS message for the target node to both the non-constrained links and the constrained links. The switch may then forward the NS message according to the determination.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
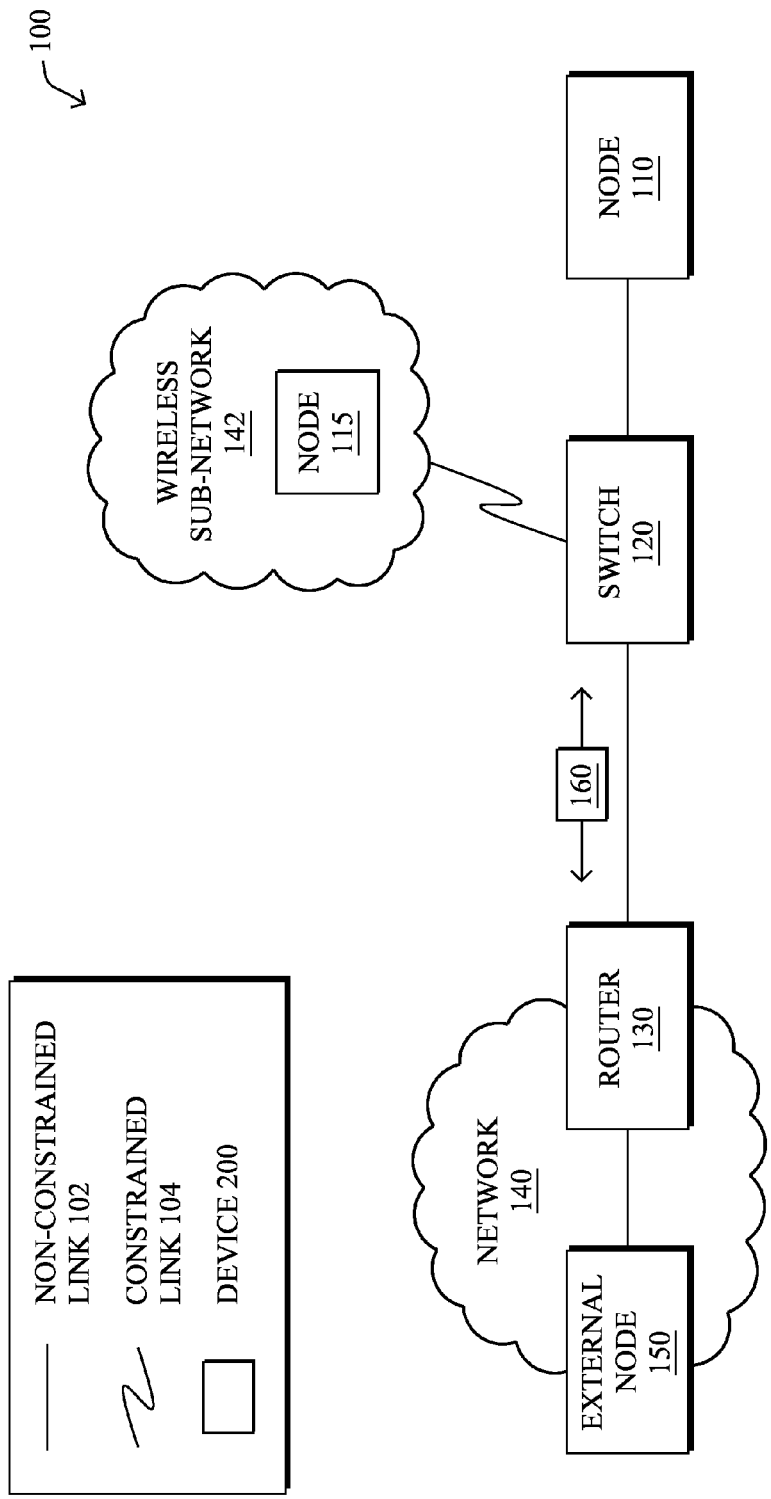
FIG. 1 illustrates an example communication network.

FIG. 1 is a schematic block diagram of an example computer network 100 illustratively comprising nodes/devices 200 such as one or more client devices (e.g., target node 110) interconnected via a switch 120 to a router 130 of a network (e.g., WAN) 140. In addition, an external node 150 may be located outside of the target node's local network (e.g., between router 130 and nodes 110 and 115). The links between devices may be non-constrained links 102 (e.g., wired links) or constrained links 104 (e.g., shared media, wireless links, PLC links, etc.) where certain nodes 200 may be in communication with other nodes 200 (e.g., based on physical connection configuration) current operational status, distance, signal strength location, etc. The computer network 100 may include one or more computer sub-networks such as, for example, wireless sub-network 142, which may include one or more nodes 115 in communication with switch 120 via constrained link 104 (e.g., a wireless link). Those skilled in the art will understand that any number of nodes, devices, links, etc. may be used in the computer network, and that the view shown herein is for simplicity.

Data packets 160 (e.g., traffic and/or messages such as neighbor solicitation (NS) messages, neighbor authentication (NA) messages, etc., sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
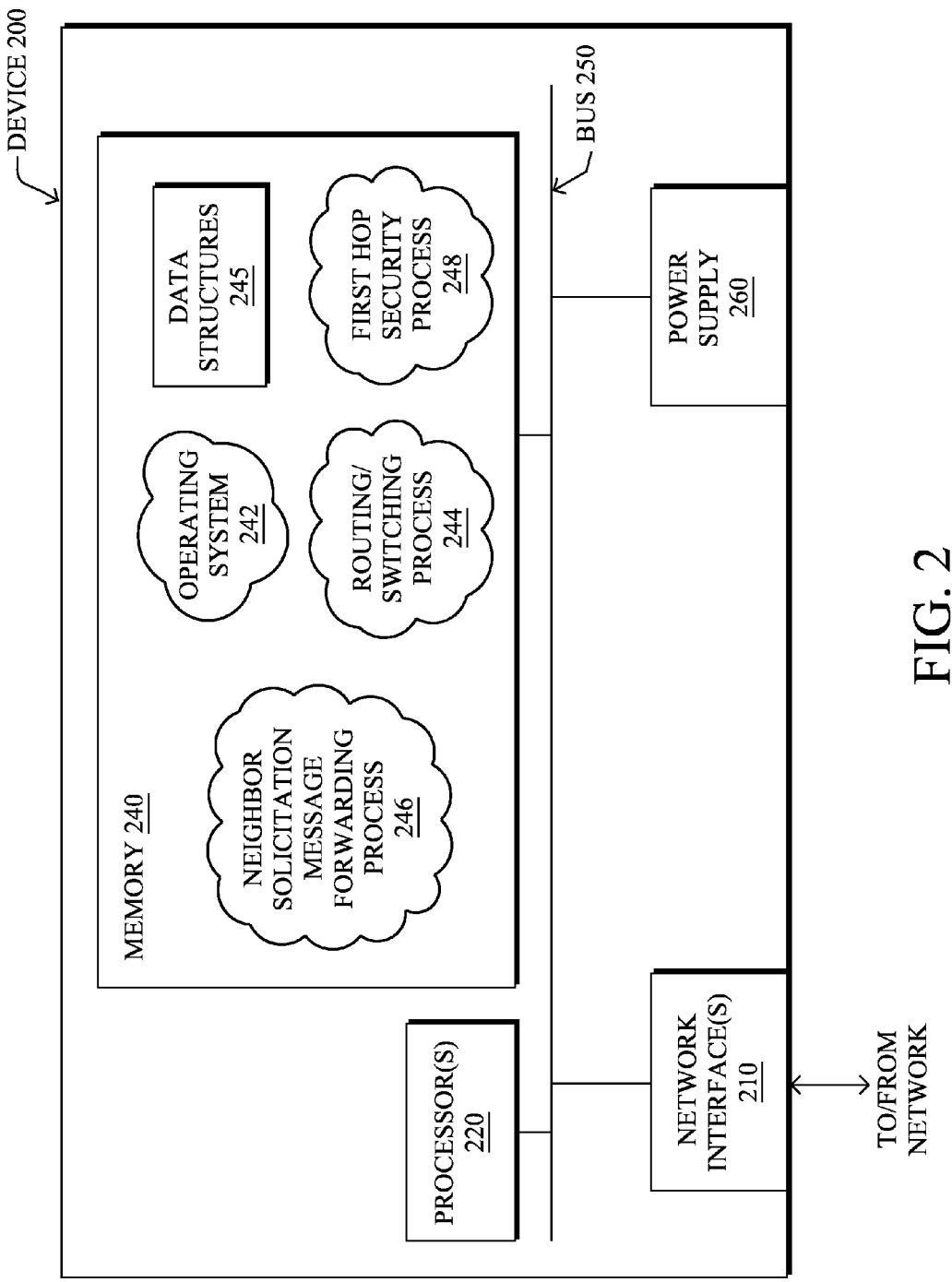
FIG. 2 illustrates an example network device/node.

FIG. 2 is a schematic block diagram of an example node/device 200 that may be used with one or more embodiments described herein, e.g., as any of the devices shown in FIG. 1 above, such as a router or a switch, as described below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless (e.g., constrained links 104) and wired/physical connections (e.g., non-constrained links 102), and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing/switching process 244 (e.g., for a router or switch, respectively), an NS message forwarding process 246, as well as an illustrative first hop security process 248. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, it may be desirable for switches and/or other network devices to be more and more IPv6-aware in order to protect the network against rogue or uncontrolled behaviors, particularly in secure environments. For instance, IPv6 (Internet Protocol version 6) "First Hop Security (FHS)" is a switch feature that protects the layer-2 (L2) network against misuse of IPv6 protocols such as the neighbor discovery (ND) protocol (NDP) and the dynamic host configuration protocol (DHCP).

In particular, there are a growing number of large-scale IPv6 deployments at enterprise, data center, university, and government networks. For the success of each of these networks, it may be important for the IPv6 deployments to be secure and of a service quality that is at least comparable to that of the existing IPv4 infrastructure. Network users generally have an expectation that there is functional parity between IPv4 and IPv6, and on each of these protocols the security and serviceability concerns are similar. From the network operator perspective, there is a similar assumption that both IPv4 and IPv6 are secure environments with a high degree of traceability and quality assurance.

Network security threats are very much tied to the topology of a network infrastructure, and IPv6 brings in specific changes from a topology perspective, for example:
  More end nodes are allowed on the link (up to 264, where end nodes notably need not be the very end of a communication path);
  Bigger neighbor caches are on the end nodes;
  Bigger neighbor caches are on the default router;
  etc.

These network topology changes may create more opportunities for denial-of-service (DoS) attacks.

In addition to the topological aspects, there are network security threats closely related to the protocols in use:
  Neighbor Discovery Protocol (NDP) integrates all link operations in charge of determining address assignment, router discovery, and associated tasks such as, for example, redirect.
  Dynamic Host Configuration Protocol (DHCP) has a smaller role in address assignment in comparison to IPv4.
  Non-centralized address assignment creates true challenges for controlling address misusage.

Due to the increased implementation in IPv6 technology and the intrinsic differences between IPv4 and IPv6 outlined above, it is very important to have both a secure IPv4 environment and a secure IPv6 environment. Link operations may be secured at three different locations within the network: the end nodes (e.g., nodes 110 and 115), at the first hop within the network (e.g., switch 120), and at the last hop (e.g., router 130).

When performing security at the end node, a distributed model provides for end nodes that take care of themselves, and does not provide any link operation with bottlenecks or single points of failure. This security model does not need central administration or operation as it is assumed that each node takes care of itself. The ultimate level of security in this model is accomplished by a SeND (RFC 3971) deployment. This model is especially good for threats coming directly from the link; however, it provides poor protection against threats from offlink devices. Another consideration for this model is that, due to its distributed nature, a degree of complexity and heavy provisioning of end nodes is involved that spreads over the complete networking domain that is being secured.

The model for security at the first hop switch is based upon a centralized model run by a centralized security administration. The burden of security enforcement of the previous model is pushed toward the first hop device, making this model a more scalable model as fewer devices are affected by the security tasks involved. This model makes the transition from a non-secure link operation to a secure network easier as fewer components will have to be touched, monitored, and reconfigured. While this model is a very convenient model for the network operator and the actual end user, it is generally applicable in certain topologies in which all end users go through a network operator aggregation device capable of securing the link operations. This model increases the intelligence and the awareness that first hop networking devices need to have about the actual end nodes attached.

For security at the last router, a centralized model secures against threats coming from outside of the link that is being protected. A property of this model is that the attached link is protected, as well as all of the downstream network elements. This model has generally been combined with the first hop switch model to defeat threats that come from inside when, for example, a device has been compromised and is affecting the Internet network infrastructure. It requires the last hop router to learn about end nodes.

In comparison with IPv4, IPv6 has an increased set of capabilities to simplify end-system autoconfiguration while at the same time running service detection by means of Internet Control Message Protocol Version 6 (ICMPv6). One of the new functionalities within ICMPv6 is the Neighbor Discovery Protocol (NDP), which is an application and operates above ICMPv6. NDP makes heavy usage of multicast packets for on-the-wire efficiency. The functional applications of NDP include:
  Router discovery;
  Autoconfiguration of addresses, e.g., stateless address autoconfiguration (SLAAC)
  IPv6 address resolution, e.g., replacing Address Resolution Protocol (ARP) (note that the acronym ARP herein may simply refer to both IPv6 address resolution and the Address Resolution Protocol);

Neighbor reachability, e.g., neighbor unreachability detection (NUD);

Duplicate address detection (DAD); and

Redirection.

The Secure Neighbor Discovery (SeND) (RFC 3971) is a protocol that enhances NDP with three additional capabilities:

Address ownership proof, which makes stealing IPv6 addresses "impossible," is used in router discovery, DAD, and address resolution, and is based upon Cryptographically Generated Addresses (CGAs). Alternatively, it also provides non-CGAs with certificates;

Message protection, which includes message integrity protection, replay protection, and request/response correlation, and is used in all NDP messages;

Router authorization, which authorizes routers to act as default gateways, and specifies prefixes that routers are authorized to announce "on-link."

While SeND provides a significant uplift to the IPv6 neighbor discovery technology by introducing the above enhancements, it does not, for example, provide any end-to-end security and provides no confidentiality.

The first hop for an end node is very often an L2 switch. By implementing security features, the first hop switch may alleviate many of the caveats of a SeND deployment and increase the link security model. The first hop switch is strategically located to learn about all its neighbors, and hence the switch can easily either allow or deny certain types of traffic, end-node roles, and claims. In its central position, the first hop switch can fulfill a number of functions. It can inspect neighbor discovery (ND) traffic and provide information about Layer 2/Layer 3 (L2/L3) binding and monitor the use of ND by host to spot potentially abnormal behaviors. Ultimately, the switch can block undesired traffic such as rogue Router Advertisement (RA), rogue DHCP server advertisement, and data traffic coming from undesired IP addresses or prefixes.

An externally generated scanning attack is an attack, particularly against the first hop security model, in which an attacker (e.g., external node 150) sends a packet to a large number of IPv6 addresses that are derived from the same subnet. ND requires that a receiving router 130 creates an entry in its ND cache 246 for each of these scanned addresses, and keeps the entry for multiple seconds, which can result in a memory depletion in the router and limit the capability by the router to serve existing hosts in the subnet. This attack is a big concern in IPv6 (and exists in IPv4 as well) because of the size of the subnet (allowing the attacker to create more state in the router) and because the router is expected to store packets that triggered the resolution.

The Source Address Validation Improvements (SAVI) Working Group at the Internet Engineering Task Force (IETF) has been studying implementations for first hop security, however, no efficient solution to the above attack has been yet presented.

IPv6 FHS is a suite of features that operates on a switch to protect the L2 network against misuse of IPv6 protocols such as NDP and DHCP. In particular, the Neighbor Discovery Protocol (Request for Comment (RFC) 4861, "Neighbor Discovery for IP version 6 (IPv6)" by T. Narten, et al. (September 2007 edition, obsoleting RFCs 2461 and 1970) is a multicast intensive protocol that has the potential to generate a significant degree of control plane overhead. For example, when a device "X" needs to reach a target device "Y" on the same link, and X does not have a MAC address for Y, X sends a multicast neighbor solicitation (NS) message to determine the MAC address of Y. The FHS suite, in part, functions to alleviate NDP-generated overhead by snooping control traffic to identify all devices present on a link. This information is then used to build an FHS database, which allows a switch hosting the FHS database to act as a proxy for attached devices when receiving a multicast NS message. For example, if Y is present in a switch's FHS database, then the switch may act as a proxy and reply directly to X with Y's MAC address to avoid unnecessary multicasts/broadcasts. Additionally, the switch may unicast the request to Y at L2. However if Y is not present in the switch's FHS database, then the NS message may be broadcast to the entire VLAN.

While many of the features in the FHS suite addresses link-operations vulnerabilities, other features of the FHS suite improve the scalability of the L2 domain by proxying and throttling some of the control traffic. In a large L2 domain (e.g., an enterprise network, data-center, etc.), many switches attach many devices, and each switch FHS database only stores the devices that are directly attached to the switch (according to draft-ietf-savi-fcfs-14). Accordingly, there is a very low probability that any given switch that processes a multicast NS message will actually be attached to the target device (in fact, only one switch in the entire network will be attached to the target device). So, even in the presence of an FHS database-mediated proxy feature, the NS message may still need to be broadcast, further increasing control plan overhead.

It should also be noted that in a large switched network topology, the cost of distributing multicast NS messages to certain classes of devices may be prohibitive. For example, this may be the case for a device that runs on batteries, or a device that is reachable over a wireless interface. For such devices, it may be beneficial to reduce the amount of NS multicast messages while preserving the functionality expected in the IPv6 Neighbor Discovery Protocol. In particular, it should be noted that in order to support virtual local area networks (VLANs) on 802.11, a controller usually unicasts a packet to all wireless devices that are members of the group, one by one. This poses a significant security risk in IPv6 with respect to a scanning attack because the effect will be multiplied with respect to the wireless network, effectively creating a denial of service (DOS) attack on the wireless network.

Illustratively, a current implementation may be described in which the switch may be, for example, a controller such as WLC or NG3K, and the constrained links may all be wireless and access ports. FHS has a support for identified groups of ports such as, for example, one group for all wired and one for all wired switches that is used for the distributed states operations (e.g., multi-switch). According to a current implementation, a process may flow as follows: First, an initial NS multicast lookup message may be received at the switch and forwarded only to the group of wired connections; additionally, an entry for the NS lookup message may be created in an NS database in an UNKNOWN state. Second, a subsequent NS multicast lookup message may be received by the switch and forwarded to all groups (e.g., all associated switch connections). Third, a third and/or fourth NS multicast lookup message may be received at the switch, and these NS messages may be forwarded only to the group of wired connections. Fourth, any subsequent NS multicast lookup message received at the switch may be dropped. After a period of time (e.g., about 1 minute), the entry for the NS message in the NS database may be removed. If a target device is found during that period of time, the entry may be converted as a normal Binding Table entry. In the case of distributed states (e.g., a multi-switch), the entry may not removed, but rather kept UNKNOWN for the minute in order to further protect the constrained links from broadcast NS traffic, but the behavior is set to wired switches only permanently.

Throttling and Limiting the Scope of NS Traffic

According to one or more embodiments of the disclosure, the techniques herein provide for NS message traffic control to reduce control plane overhead and to protect against a scanning-type attack that attempts to manipulate the NDP (RFC 4861). NS message traffic control may reduce control plane overhead in the situation where many hosts search for the same "special" target device (e.g., a printer, router, DNS server, etc.). This scenario is problematic if, for example, the switch receiving the NS message is not on the spanning tree protocol (STP) path of the neighbor advertisement (NA) reply because it will likely not have this "special" device listed in its FHS table. NS message traffic control may also provide protection against a scanning-type attack when, for instance, an attacker may send a large number of NS messages that an intermediate switch broadcasts all of the ports in the same VLAN. Such an attack cannot be addressed by simply dropping the multicast NS because this would effectively break IPv6. The NS message traffic control techniques herein provide that such NS related issues may be addressed by 1) limiting the scope of the broadcast NS message (e.g., by only forwarding it to non-constrained nodes such as, e.g., wired links, wired access, wired trunks, etc.) and 2) throttling the broadcast messages (e.g., so that the NS message is forwarded in an intermittent manner to both non-constrained and constrained links).

Illustratively, the techniques described herein may be performed by hardware, software, and/or firmware, such as in accordance with the illustrative first hop security process 248, which may each contain computer executable instructions executed by the processor 220 to perform functions relating to the techniques described herein, e.g., in conjunction with routing/switching process 244. For example, the techniques herein may be treated as extensions to conventional first hop security protocols, and as such, may be processed by similar components understood in the art that execute those protocols on the specific device (e.g., router 140 or switch 120) performing the action being described, accordingly.

Figure 3A:
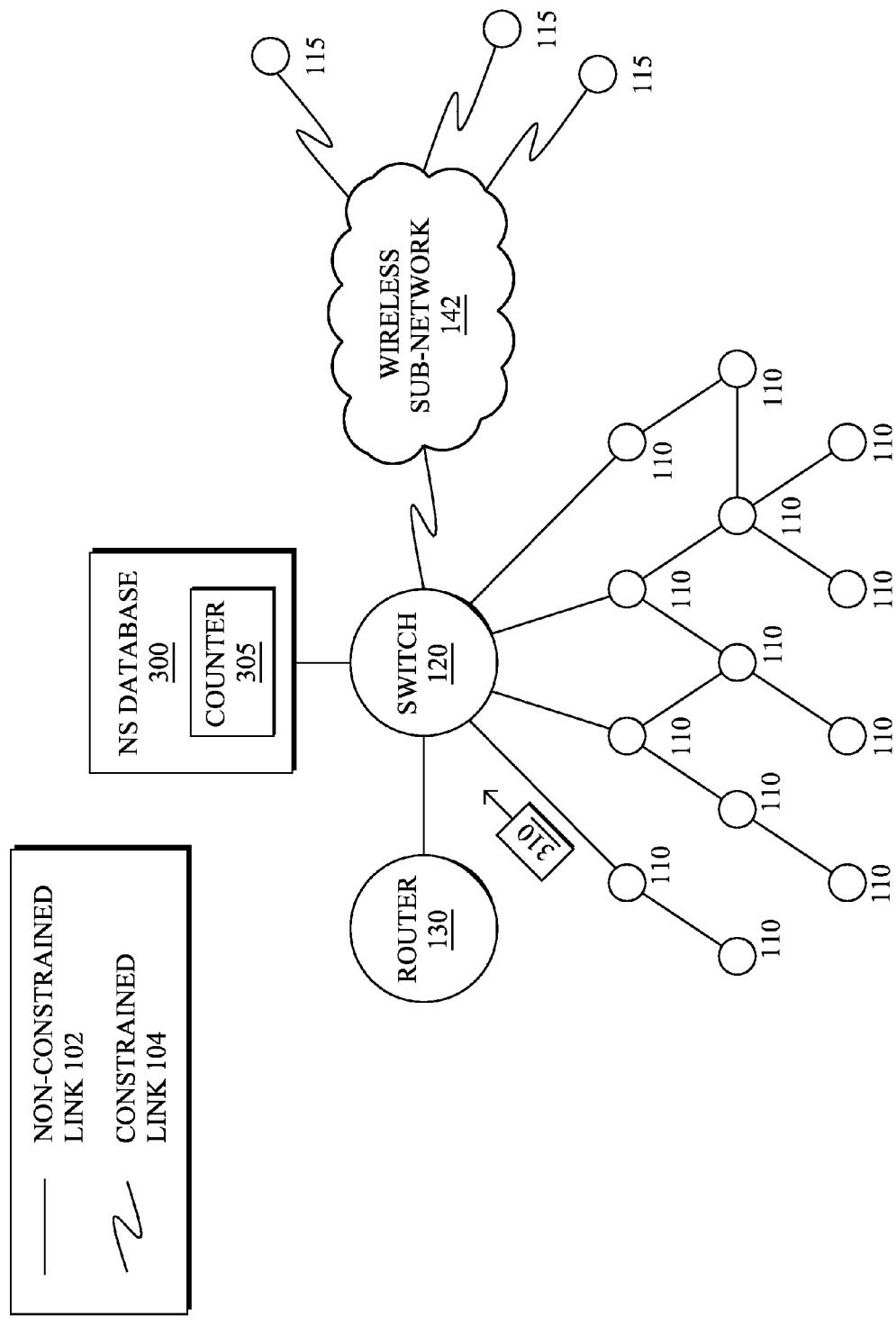
FIGS. 3A-3D illustrate examples of neighbor solicitation (NS) message forwarding by a switch n the communication network.

Operationally, the FHS suite may be extended to include an NS database 300 of multicast NS messages per destination (e.g., router, switch, etc.), which may be hosted on a capable node such as, for example, switch 120, as shown in FIG. 3A. According to the techniques herein, NS database 300 may facilitate limiting and throttling the broadcast of received NS message 310 forwarding by aiding switch 120 (i.e., the receiving device) in determining whether to forward the NS message to only non-constrained links of the switch or to both non-constrained links and constrained links of the switch. In the later case, the determining of switch 120 is configured to intermittently result in forwarding the NS message for the target node to both the non-constrained links and the constrained links.

Figure 3B:
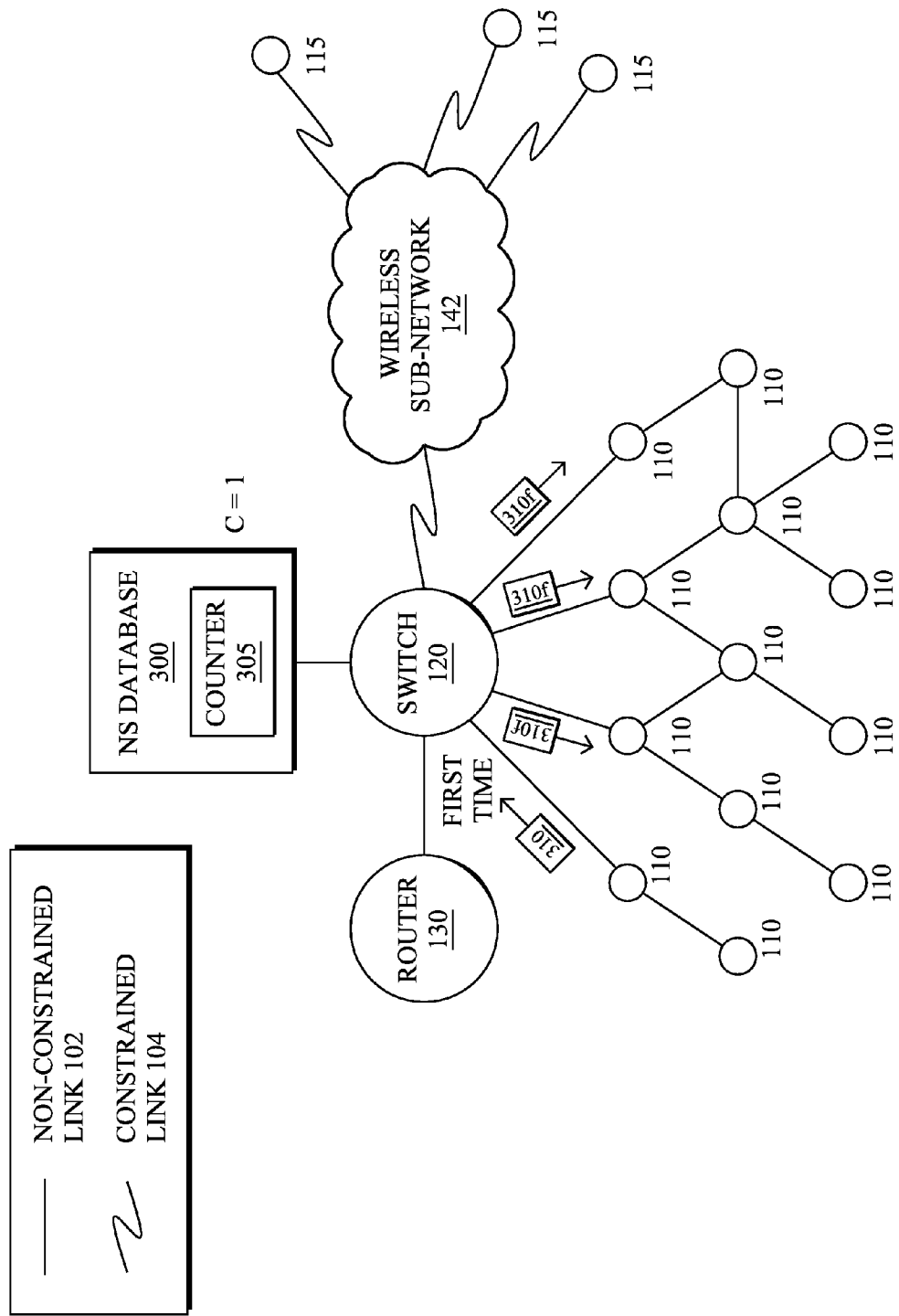

In one embodiment, when an NS message 310 destined for a particular target is received at switch 120 for the first time, it may be added to the local NS database 300, counter 305 ("c") may be incremented to c=1, and the NS message 310 may be forwarded (e.g., NS message 310f) only to devices 110 on non-constrained links 102 (e.g., wired connections, wired trunks, etc.), as shown in FIG. 3B. In one embodiment, the entry in NS database 300 corresponding to NS message 310 may be given a lifetime (e.g., a lifetime of between about 5 seconds and 60 minutes, or more, depending upon the particular network involved).

Figure 3C:
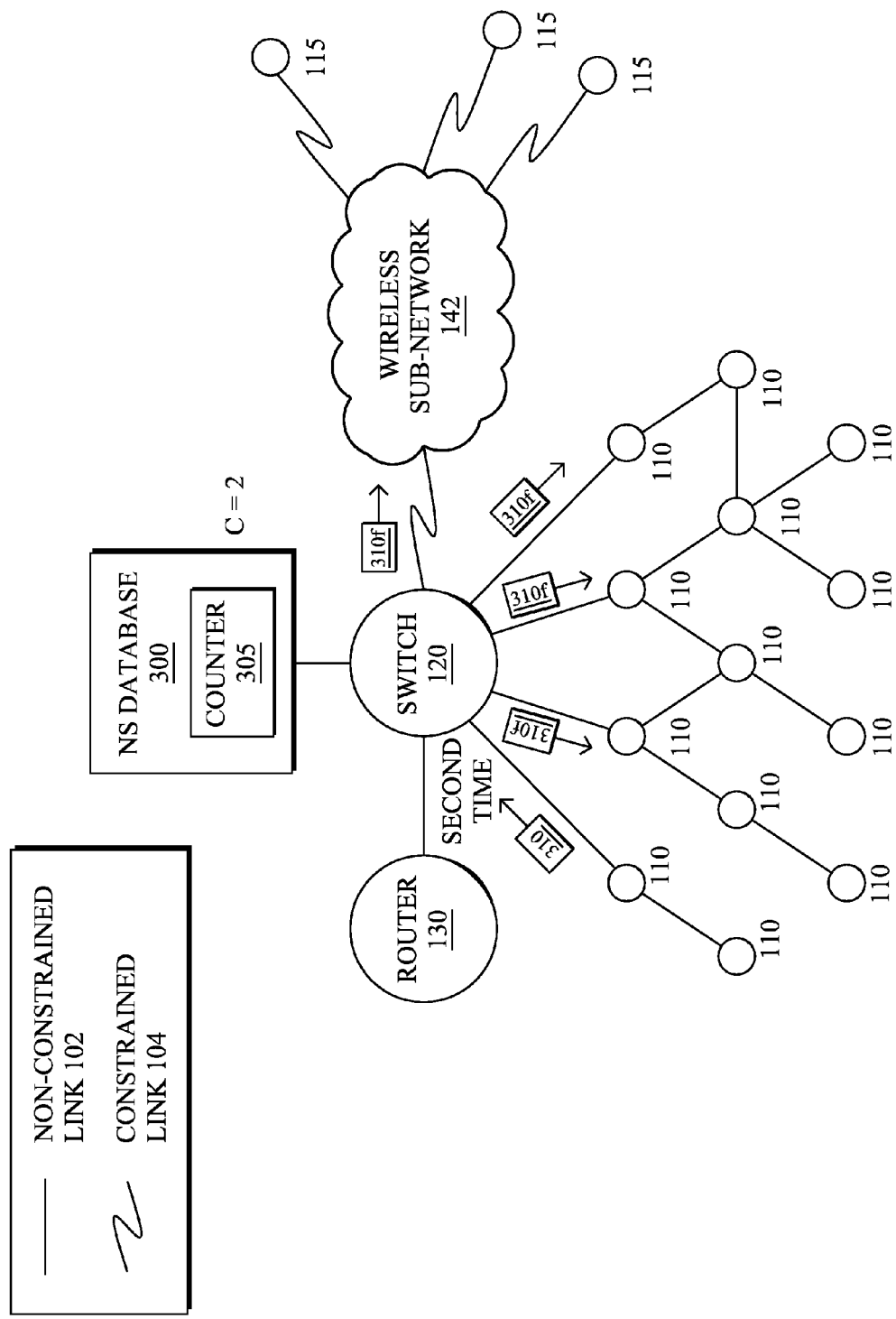
Figure 3D:
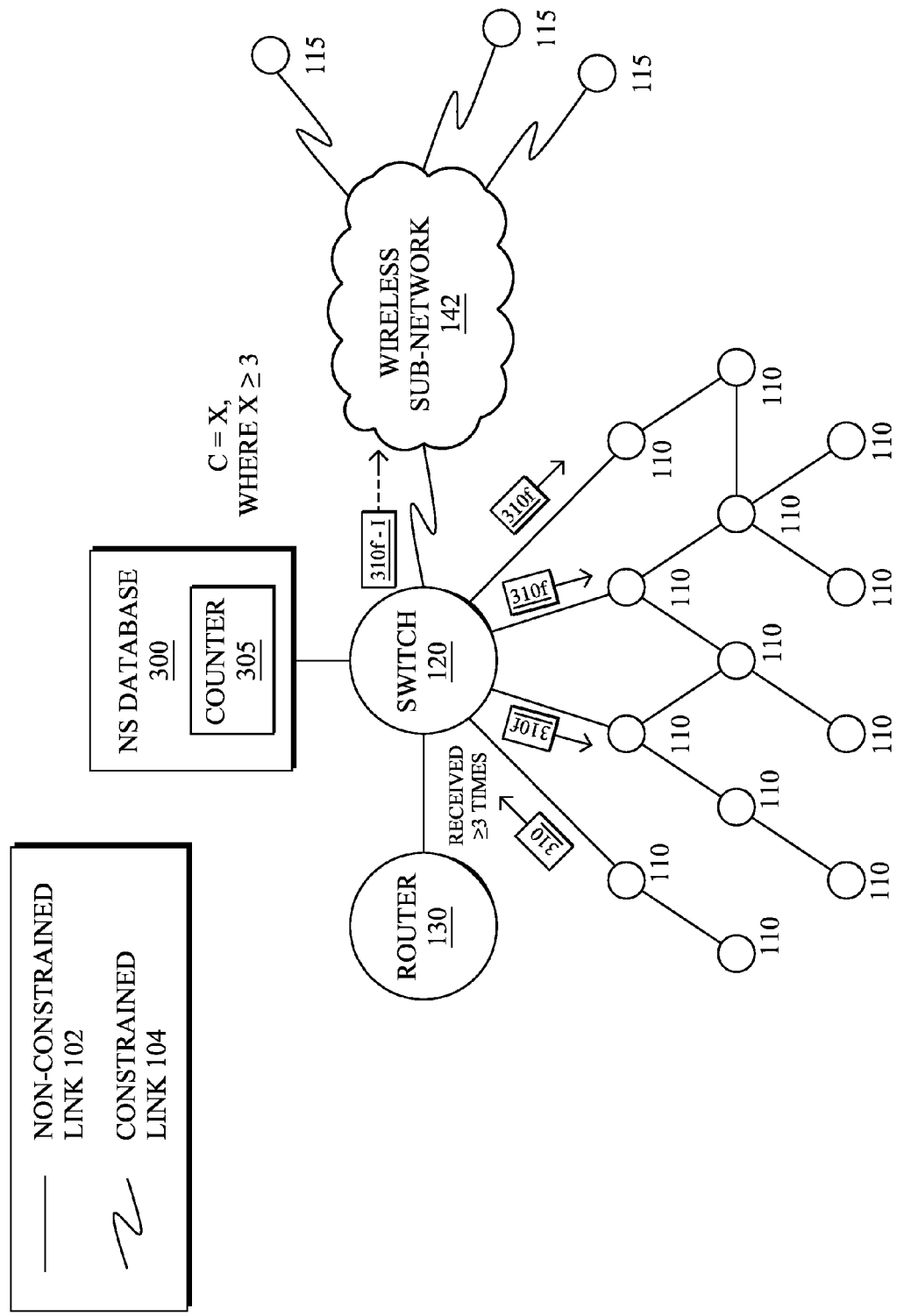

As shown in FIG. 3C, when NS message 310 is received by switch 120 for the second time, counter 305 may be incremented to c=2, and the NS message may be forwarded (e.g., NS message 310f) to both non-constrained links 102 and constrained links 104 (e.g., wireless sub-network 142). In other words, the second time NS message 310 is received by switch 120, it may be broadcast to all of the switch's associated links.

According to the techniques herein, when message 310 is received by switch 120 three or more times, counter 305 may be incremented to the corresponding value c=x (where X is ≥3), and the switch may determine to configure it's forwarding of NS message 310 to intermittently result in forwarding the NS message 310 for the target node to both the non-constrained links and the constrained links. In other words, if NS message 310 is received more than two times at a particular device (such as switch 120), forwarding of the NS message 310 may be throttled so that NS message 310 continues to be forwarded over non-constrained links 102 (e.g., NS message 310f), while it is intermittently forwarded over constrained links 104 (e.g., NS message 310f-I). This contrasts with conventional solutions, in which forwarding of NS message 310 is simply dropped after the NS message 310 has been received a particular number of times (e.g., 4 times). Note that in one embodiment a further distinction may be made, depending upon whether the non-constrained link is to other switches (i.e., a trunk) or to final devices (i.e., an access port), where the NS message is sent mostly (more often or only) to trunks (along the spanning tree), since even if there is no state for an NA in this switch, another switch may have a state for the NA, while the directly connected access nodes do not.

The techniques herein provide that intermittent forwarding of NS message 310 to constrained links 104 (e.g., NS message 310f-I) may be based on any of a variety of parameters including, but not limited to, a periodic time interval (e.g., NS message 310 may be broadcast to the constrained links 104 once every 5 to 300 seconds, or more), a maximum number of broadcast messages (e.g., NS message 310 may be broadcast to the constrained links 104 over a particular period of time, such as 5 to 300 seconds, or more, but only up to a particular maximum value, such as only forwarded 15 times in 300 seconds), a counter value (e.g., NS message 310 may be broadcast during a throttle period that is inversely correlated to the counter value), lifetime of an entry in the NS database (e.g., the remaining lifetime of the NS message 310 entry in NS database 300 may set the throttle period), etc. In one embodiment, the parameter used to configure the intermittent forwarding of NS message 310 may be established by a policy configuration.

After a particular number of delivery attempts for NS message 310, the switch 120 may determine that the target device is not on the same side of the spanning tree, and may stop forwarding NS message 310 to both constrained links 104 and non-constrained links 102. Advantageously, this may block looping of NS message 310 during a transient network inconsistency. When the lifetime of the NS database entry expires, it may be removed from the NS database until an NS message for that particular target destination is received again.

If an NA reply is received during the lifetime of the NS message entry in NS database 310 by the switch 120, then the system may respond differently depending upon the switch configuration. For example, in a single switch configuration, receipt of an NA reply may result in the NS database entry for the NS message being deleted, and the switch's FHS database may be updated to reflect the change in message status. In multi-switch configuration, the switch may not keep a state for this destination in its FHS database, in which case the NS database entry may be retained and flagged so that subsequent NS messages received for that destination are always throttled.

According to the techniques herein, network devices such as, e.g., a router, printer, DNS server, DHCP relay, etc., that are more likely to be the target of an NS message may receive special treatment. Such "special" devices may be identified by various heuristics such as, for example, the following:

- Identifying a high number of NS multicast messages received by the same target, which are sent by different sources (e.g., information readily tracked by the above-identified NS database);
- Snooping the Service Discovery Protocols, which may be advantageous in that it may provide better granularity in device identification;
- Snooping Router Advertisements received by the switch (e.g., to identify routers);
- Querying a DHCP server or a database for a list of well known devices (e.g., a bulk query), and then locating the known devices through ND, first over the unconstrained interfaces and then globally by trying a second time.

Once such a special device has been identified, the above-described parameters may be dynamically modified for that specific device entry in NS database 300. For example, the lifetime of the entry of such a special device in NS database 300 may be extended (e.g., by hours, days, or months), or the lifetime value may be reset as soon as it expires since such "special" devices are not generally considered to be constrained devices.

Figure 4:
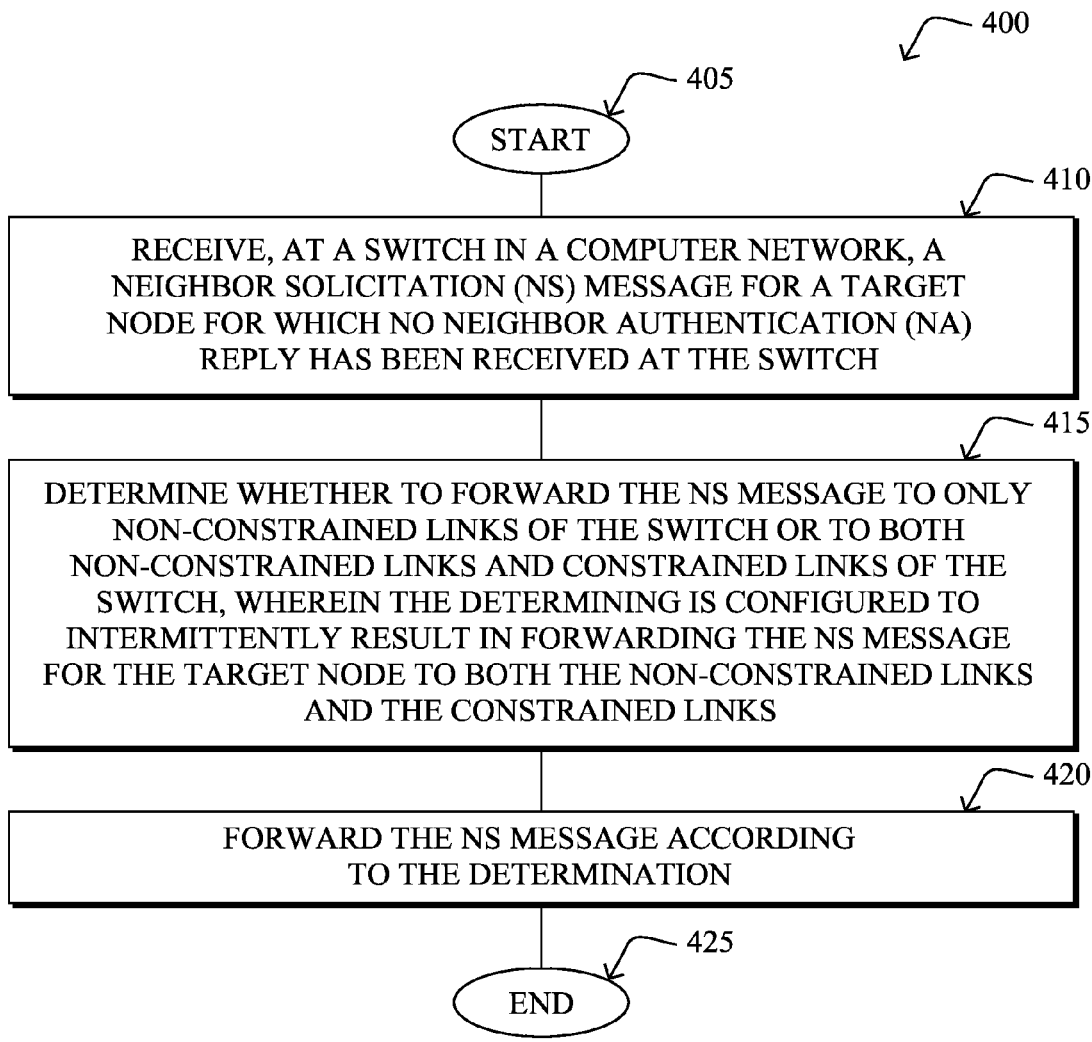
FIGS. 4-5 illustrate example simplified procedures for NS traffic control in a computer network.

FIG. 4 illustrates an example simplified procedure for throttling and limiting the scope of NS traffic in accordance with one or more embodiments described herein. The procedure 400 may start at step 405, and continues to step 410, where, as described in greater detail above, a switch in a computer network may receive a neighbor solicitation (NS) message for a target node for which no neighbor authentication (NA) reply has been received at the switch, as shown in step 410. The switch may then determine whether to forward the NS message to only non-constrained links of the switch, or to both non-constrained links and constrained links of the switch, where the determining may be configured to intermittently result in forwarding the NS message for the target node to both the non-constrained links and the constrained links, as illustrated in step 415. The switch may then forward the NS message according to the determination as in step 420. The illustrative simplified procedure 400 may then end in step 425, notably with the ability of the switch to continue to receive new NS messages and determine whether and how to forward the NS messages.

Figure 5:
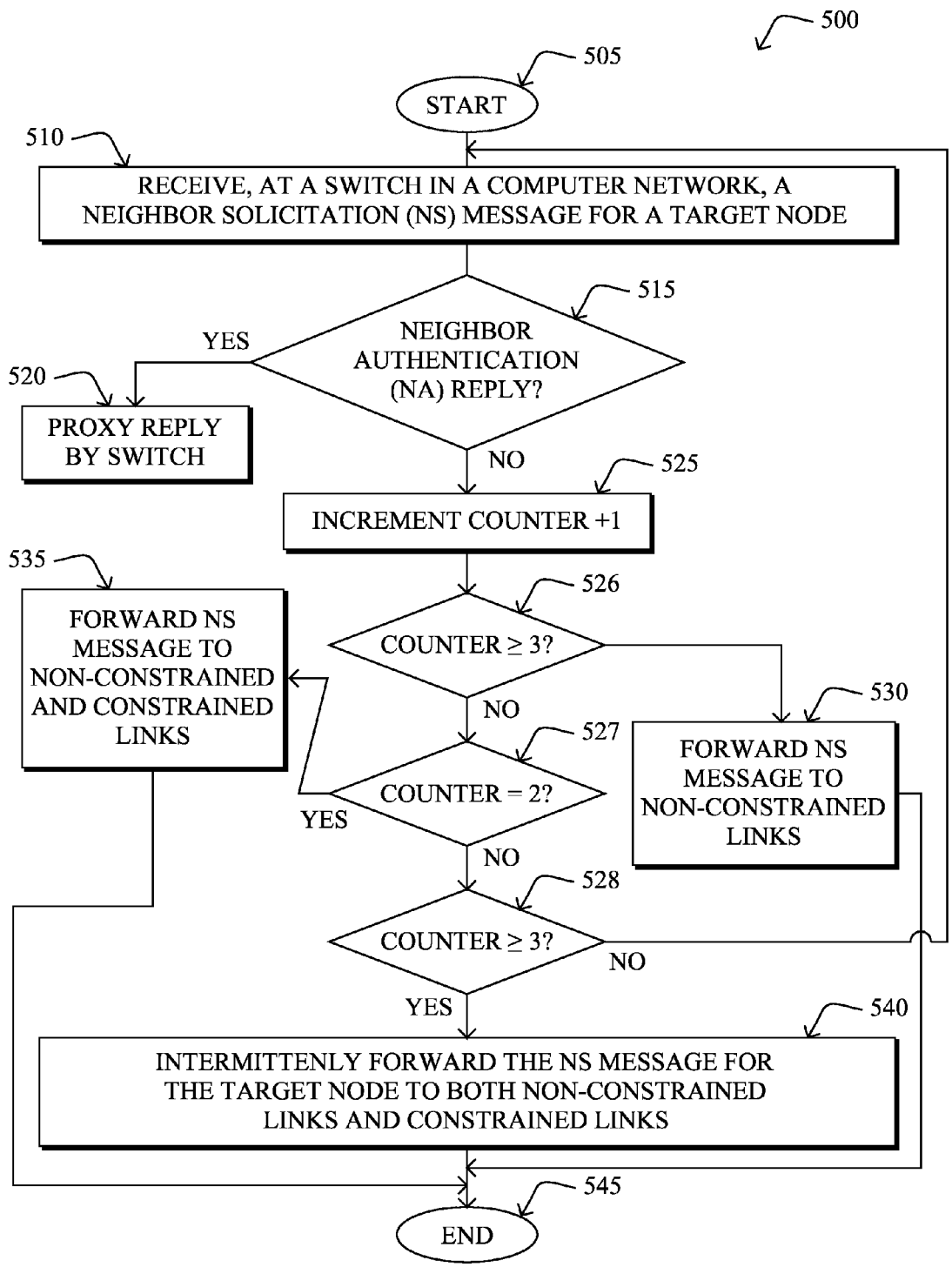

FIG. 5 illustrates an example simplified procedure for throttling and limiting the scope of NS traffic in accordance with one or more embodiments described herein. The procedure 500 may start at step 505, and continues to step 510, where, as described in greater detail above, a switch in a computer network may receive a neighbor solicitation (NS) message for a target node. As shown in step 515, the switch assess whether or not an NA reply has been received for that particular NS message, i.e., whether the target is known/fully resolved. If such a reply has been received by the switch (or if known/resolved), then the switch may serve as a proxy for the device and reply to the message, as shown in step 520. Note that additional logic may apply when a proxy reply is sent in step 520, where the switch either replies on behalf of the target (if the target is "fresh"), forwards (unicasts) the NS to the target (if the target is "not so fresh"), or multicasts the NS (if the target is "rotten"), where "fresh", "not so fresh" and "rotten" states are generally based on the time since a last proof of life of the target and/or a count of unanswered NS messages to the target. If such a reply has not been received in step 515, then the switch may increment a counter, as shown in step 525. The switch may then assess the value of the counter. If the counter equals 1, as shown in step 526, the switch may forward the NS message to only the non-constrained links of the switch, as shown in step 530. If the counter does not equal 1, the switch assesses whether the counter equals 2. If the counter equals 2, as shown in step 527, then the switch may forward the NS message to both non-constrained links and constrained links of the switch, as shown in step 535. If the counter does not equal 1 or 2, the switch assess whether the counter is ≥3. If the counter is ≥3, then the switch may intermittently forward the NS message for the target node to both the non-constrained links and the constrained links, as illustrated in step 540. If the counter is not greater than or equal to 3, process 500 may begin again. The illustrative simplified procedure 500 may then end in step 545, notably with the ability of the switch to continue to receive new NS messages and determine whether and how to forward the NS messages.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for throttling and limiting the scope of NS traffic in a computer network. In particular, the techniques herein provide that a switch in a computer network may receive a neighbor solicitation (NS) message for a target node for which no neighbor authentication (NA) reply has been received at the switch. The switch may then determine whether to forward the NS message to only non-constrained links of the switch, or to both non-constrained links and constrained links of the switch. The determining may be configured to intermittently result in forwarding the NS message for the target node to both the non-constrained links and the constrained links. The switch may then forward the NS message according to the determination. In particular, the techniques here allow for reduced broadcasted NS traffic in a manner that does not break the Neighbor Discovery protocol, and may be particularly useful in computer networks with a lot of wireless devices, large L2 enterprise domains, large data centers, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a switch in a computer network, a neighbor solicitation (NS) message for a target node for which no neighbor authentication (NA) reply has been received at the switch;
   determining whether to forward the NS message to only non-constrained links of the switch or to both non-constrained links and constrained links of the switch, wherein the determining is configured to intermittently result in forwarding the NS message for the target node to both the non-constrained links and the constrained links; and
   forwarding the NS message according to the determination.

2. The method as in claim 1, further comprising:
   identifying the target node as a special target node based on one or more criteria; and
   dynamically modifying the target node entry in the local NS database to a special target node entry.

3. An apparatus, comprising:
   one or more network interfaces to communicate within a computer network as a switch;
   a processor coupled to the network interfaces and adapted to execute one or more processes; and
   a memory configured to store a process executable by the processor, the process when executed operable to:
      receive a neighbor solicitation (NS) message for a target node for which no neighbor authentication (NA) reply has been received at the switch;
      determine whether to forward the NS message to only non-constrained links of the switch or to both non-constrained links and constrained links of the switch, wherein the determining is configured to intermittently result in forwarding the NS message for the target node to both the non-constrained links and the constrained links; and
      forward the NS message according to the determination.

4. The apparatus as in claim 3, wherein the process when executed is further operable to:
   identify the target node as a special target node based on one or more criteria; and
   dynamically modify an entry in a local NS database corresponding to the special target node to reflect the special status.

5. The apparatus as in claim 3, wherein a counter is incremented when the NS message is received.

6. The apparatus as in claim 5, wherein the counter is associated with an entry in an NS database corresponding to the NS message, the entry having a particular lifetime.

7. The apparatus as in claim 5, wherein the determination is based on a value of the counter.

8. The apparatus as in claim 7, wherein the NS message is forwarded only to non-constrained links when the value of the counter is 1.

9. The apparatus as in claim 7, wherein the NS message is forwarded to non-constrained links and constrained links when the value of the counter is 2.

10. The apparatus as in claim 7, wherein the NS message is intermittently forwarded to non-constrained links and constrained links when the value of the counter is $\geq 3$.

11. The apparatus as in claim 10, wherein intermittently forwarded is determined based on one or more parameters selected from the group consisting of a periodic time interval, a maximum number of broadcast messages, a counter value, a lifetime of an entry in the NS database, a policy configuration, a throttle period, a frequency of NS messages broadcast during a throttle period.

12. The apparatus as in claim 11, wherein the frequency of NS messages broadcast during a throttle period is inversely correlated to the counter value.

13. The apparatus as in claim 11, wherein the lifetime of an entry in the NS database ranges from about 5 seconds to about 300 seconds.

14. The apparatus as in claim 13, wherein the entry is removed from the NS database when the lifetime expires.

15. The apparatus as in claim 5, wherein all subsequent NS messages for the target node are dropped once the counter reaches a particular value.

16. The apparatus as in claim 3, wherein the process when executed is further operable to:
    receive an NA reply from the target node during the lifetime of the NS message entry, wherein the switch is a single switch;
    delete the target node entry in the local NS database; and
    update a first hop security (FHS) database with the target node.

17. The apparatus as in claim 3, wherein the process when executed is further operable to:
    receive an NA reply from the target node during the lifetime of the NS message entry, wherein the switch is a multi-switch; and
    flag the target node entry in the local NS database so that all subsequent NS lookup messages for the target node are throttled.

18. The apparatus as in claim 17, wherein the flagged target node entry is associated with an extended lifetime.

19. The apparatus as in claim 17, wherein the flagged target node entry is associated with a self-renewing timer.

20. A tangible, non-transitory, computer-readable media having software encoded thereon, the software, when executed by a processor on a switch, operable to:
    receive a neighbor solicitation (NS) message for a target node for which no neighbor authentication (NA) reply has been received at the switch;
    determine whether to forward the NS message to only non-constrained links of the switch or to both non-constrained links and constrained links of the switch, wherein the determining is configured to intermittently result in forwarding the NS message for the target node to both the non-constrained links and the constrained links; and
    forward the NS message according to the determination.

* * * * *